(12) United States Patent
Sun et al.

(10) Patent No.: US 7,341,465 B2
(45) Date of Patent: Mar. 11, 2008

(54) ELECTRICAL CARD CONNECTOR HAVING AN ANTI-MISMATING MECHANISM

(75) Inventors: Yun-Song Sun, Kunshan (CN); Qi-Jun Zhao, Kunshan (CN); Mao-Lin Lei, Kunshan (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/481,607

(22) Filed: Jul. 5, 2006

(65) Prior Publication Data

US 2008/0009161 A1  Jan. 10, 2008

(51) Int. Cl.
*H01R 13/44* (2006.01)
(52) U.S. Cl. .................................................. 439/141
(58) Field of Classification Search ............... 439/141, 439/140, 137, 135, 677, 633, 630, 680, 681, 439/247
See application file for complete search history.

(56) References Cited

U.S. PATENT DOCUMENTS

| | | | |
|---|---|---|---|
| 6,413,108 B2 * | 7/2002 | Centofante | 439/140 |
| 6,478,630 B1 * | 11/2002 | Hsu | 439/680 |
| 6,976,858 B1 * | 12/2005 | Kikuchi et al. | 439/140 |
| 7,140,891 B1 * | 11/2006 | Huang et al. | 439/137 |

* cited by examiner

*Primary Examiner*—Felix Figueroa
(74) *Attorney, Agent, or Firm*—Wei Te Chung

(57) ABSTRACT

An electrical card connector (100) for electrically connecting with an electrical card (6) includes an insulator (1) defining a receiving space (14), a number of contacts (2) retained in the insulator, a pair of latching portions (45) and a shield (5) covering the insulator (1). The shield includes a pair of fingers (512) corresponding to the latching portions (45). Each finger defines a cantilever (5121) extending into the receiving space (14) and a latch member (5122) for engaging with the latching portion (45). When a complementary card is inserted into the connector, it abuts against the cantilever (5121) and lifts the latch member (5122) outwardly. The latch member (5122) disengages from the latching portion (45). The card is further inserted in the connector and electrically connects the contacts thereof.

5 Claims, 10 Drawing Sheets

ELECTRICAL CARD CONNECTOR HAVING AN ANTI-MISMATING MECHANISM

BACKGROUND OF THE INVENTION

1. Field of the Invention

The present invention generally relates to an electrical card connector, and more particularly to a Compact Flash (CF) card connector with an anti-mismating mechanism for preventing insertions of incompatible cards.

2. Description of the Prior Art

With the development of electronic devices such as cellular phones, Personal Digital Assistants (PDA) and digital cameras, memory cards are used more and more popular wherein the memory cards contain a number of type such as Compact Flash (CF) card, Secure Digital (SD) card, Multimedia card (MMC), Subscriber Identity Module (SIM) card, Memory Stick (MS), Smart Media (SM) card and XD-picture (XD) Card.

U.S. Pat. No. 6,478,592 discloses a conventional electrical card connector which comprises an insulative housing defining a receiving space for accommodating corresponding card, a plurality of contacts retained in the insulative housing wherein each contact defines a contact portion extending into the receiving space and a tail portion projecting beyond the housing, and an eject mechanism. However, there is no anti-mismating design so that incompatible cards such as SD card, MMC card, MS card, SM card etc. may be inserted in the electrical connector by error and may destroy the contacts thereof.

Hence, an improved electrical card connector having an anti-mismating structure is needed to solve the problem above.

BRIEF SUMMARY OF THE INVENTION

A main object of the present invention is to provide an electrical card connector which can prevent incompatible cards from being fully inserted into the connector.

In order to attain the object above, an electrical card connector for electrically connecting with an electrical card, includes an insulator defining a receiving space, a plurality of contacts retained in the insulator, each contact defining a contacting portion extending into the receiving space, a spacer defining a plurality of holes for contacting portions extending therethrough, and a shield covering the insulator. The spacer further contains a pair of latching portions extending upwardly from two lateral sides thereof. The shield defines a pair of fingers corresponding to the latching portions wherein each finger defines a cantilever extending into the receiving space and a latch member located behind the latching portion of the spacer. When a complementary card is inserted into the connector, the front and top edge of the card abuts against the cantilever and lifts the latch member outwardly. The latch member disengages from the latching portion. The spacer is pushed by the card and the card is electrically connecting with the contacts thereof. However when other cards inserted in the connector, the latch member can't be moved upwardly an enough distance on account of the thickness of such cards being thinner than that of the corresponding card. In this condition, the spacer can't be moved and the card can't be further inserted, thereby preventing the contacts from being damaged.

Other objects, advantages and novel features of the invention will become more apparent from the following detailed description of the present embodiment when taken in conjunction with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE INVENTION

Figure 1:
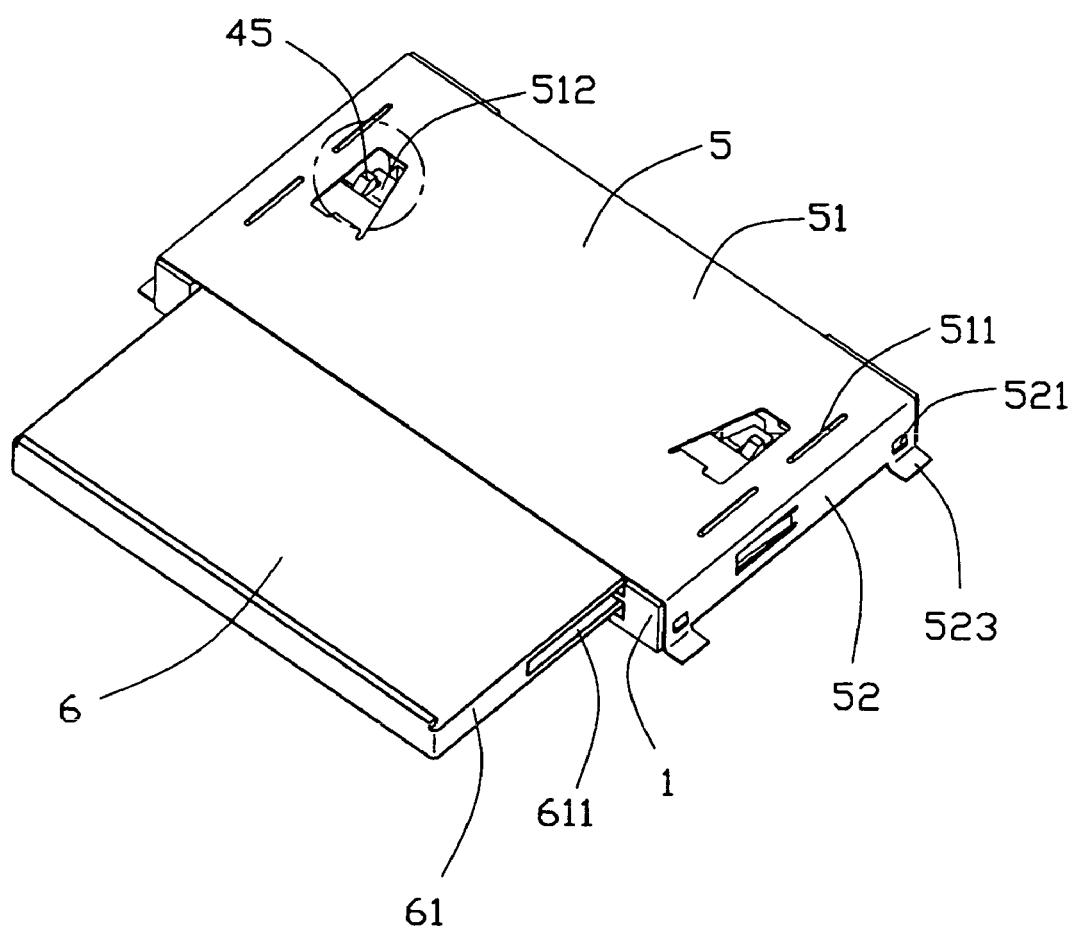
FIG. 1 is a perspective view of an electrical card connector according to the first embodiment of the present invention.
Figure 2:
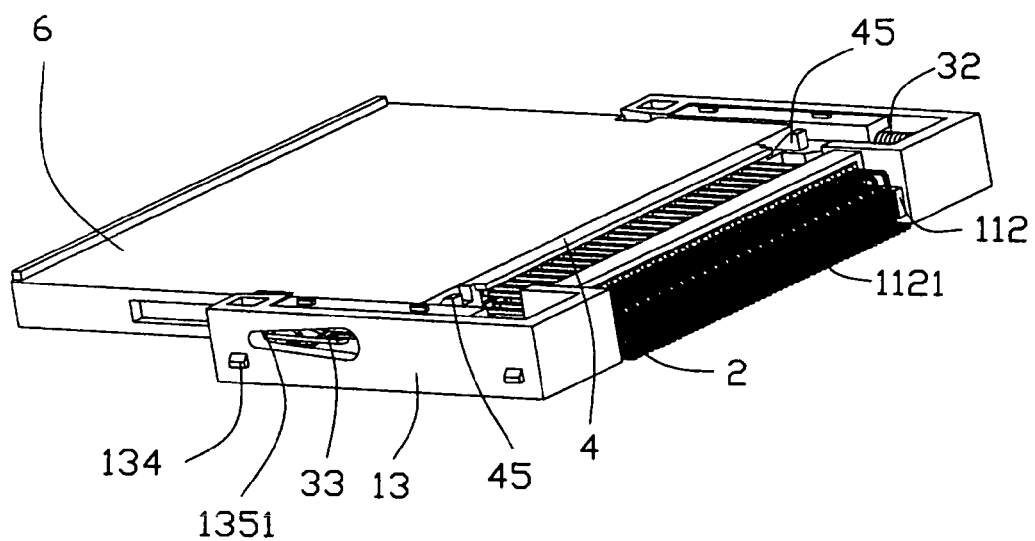
FIG. 2 is another perspective view of FIG. 1.
Figure 3:
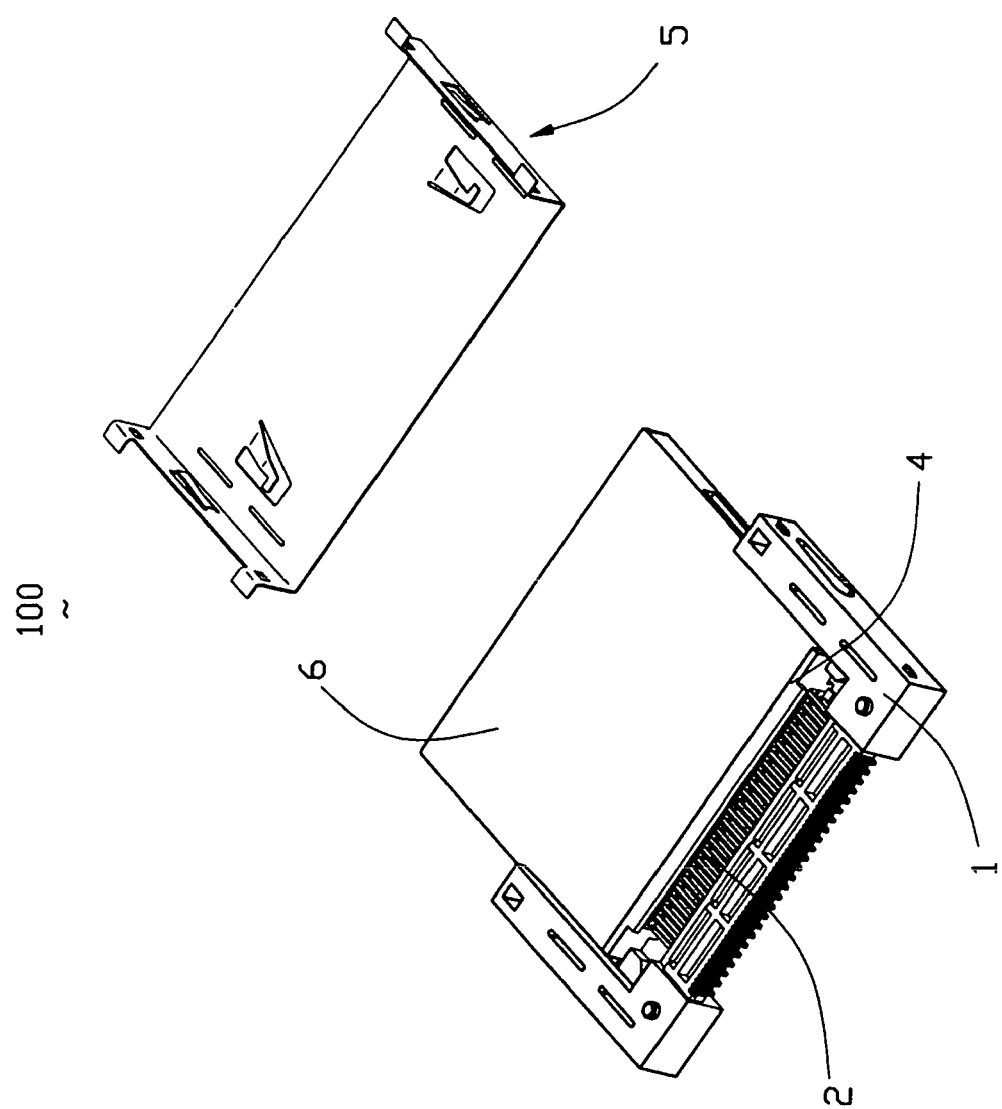
FIG. 3 is an exploded view of the electrical card connector of the first embodiment of the present invention.
Figure 4:
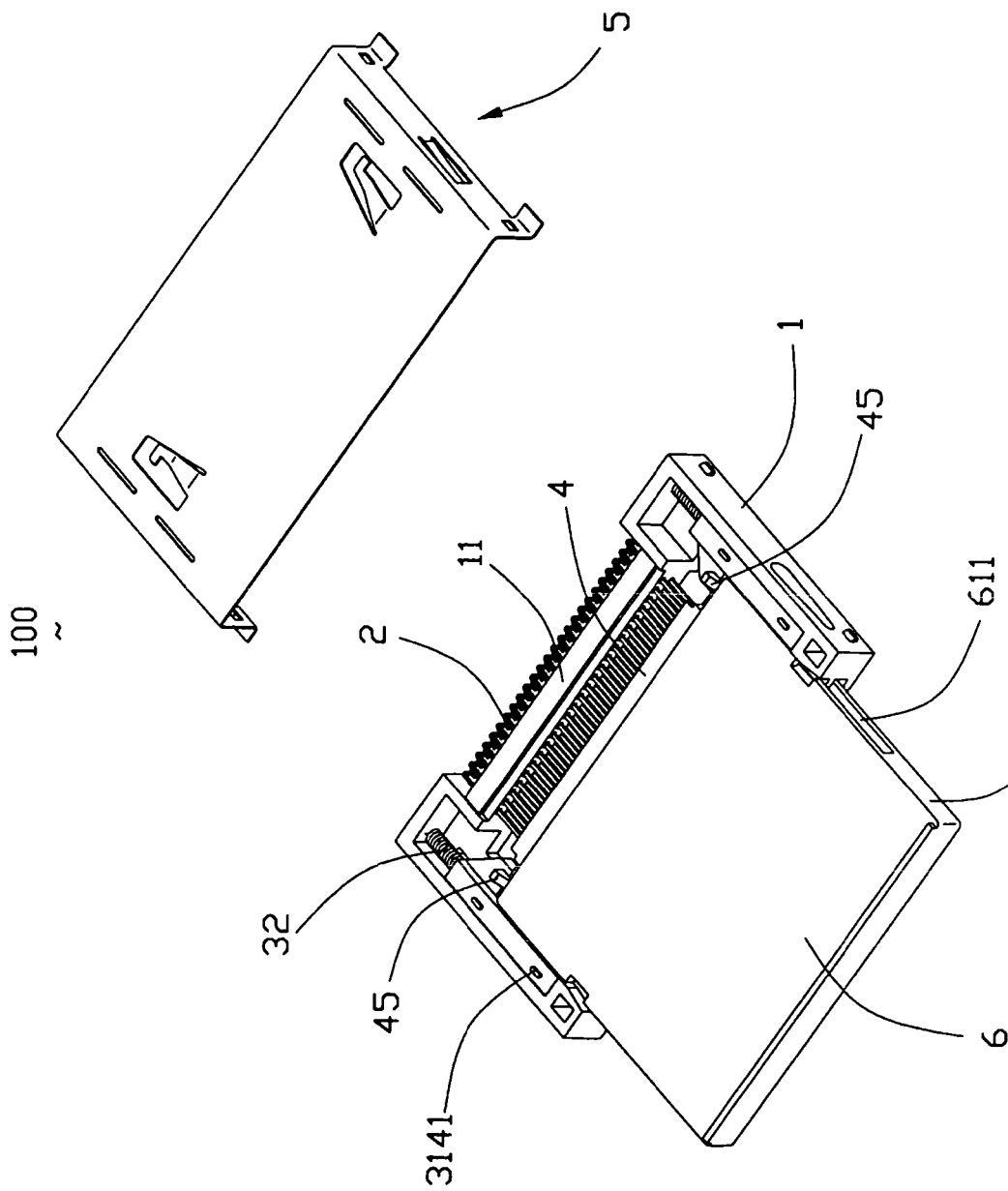
FIG. 4 is a similar view of FIG. 3, but from another perspective view.

Reference will now be made to the drawing figures to describe the present invention in detail.

Referring to FIGS. 1-5, an electrical card connector 100 according to a first embodiment of the present invention includes an insulator 1, a plurality of contacts 2 retained in the insulator 1, a pair of eject mechanism 3 mounted on the insulator 1, a spacer 4 for protecting the contacts 2 and a metal shield 5 covering the insulator 1.

The insulator 1 includes a base portion 11, a pair of parallel guiding arms 13 extending forwardly from two opposite ends of the base portion 11. The base portion 11 together with two longitudinal guiding arms 13 forms a receiving space 14 therebetween for reception of a complementary electrical card 6. The base portion 11 defines a front wall 111, a back wall 112 opposite to the front wall 111 and a plurality of passageways 113 in upper and lower rows extending through the front wall 111 and the back wall 112 for receiving the contacts 2. Corresponding to each passageway 113, an aperture 1121 vertically extends downward from the passageway 113 in the back wall 112 thereof. At a distal end of each guiding arm 13, there forms a lead flange 133 projecting from an inner side of the guiding arm 13 and a channel 132 longitudinal extending below the lead flange 133. The lead flange 133 is extending into the receiving space 14. The channel 132 defines a bottom wall 1321 thereof. As illustrated, there is a chamber 131 adjacent to the base portion 11 at the back of the lead flange 133. A couple of embosses 134 and a recess 135 are disposed in the outer side of each guiding arm 13 for abutting against the metal shield 5 wherein the recess 135 is located between the embosses 134 and further contains a mounting hole 1351 therein. The chamber 131 comprises a front stop wall 136 and a rear stop wall 137 opposite to the front stop wall 136.

The contacts 2 are substantially the same configuration. Each contact 2 comprises a contacting portion 21 fixed through the passageway 113 for electrically connecting with the electrical card 6, a retaining portion 22 secured in the aperture 1121 of the back wall 112 and a soldering portion 23 rearward extending from the retaining portion 22 to be electrically connected with a printed circuit board (PCB, not shown).

Figure 5:
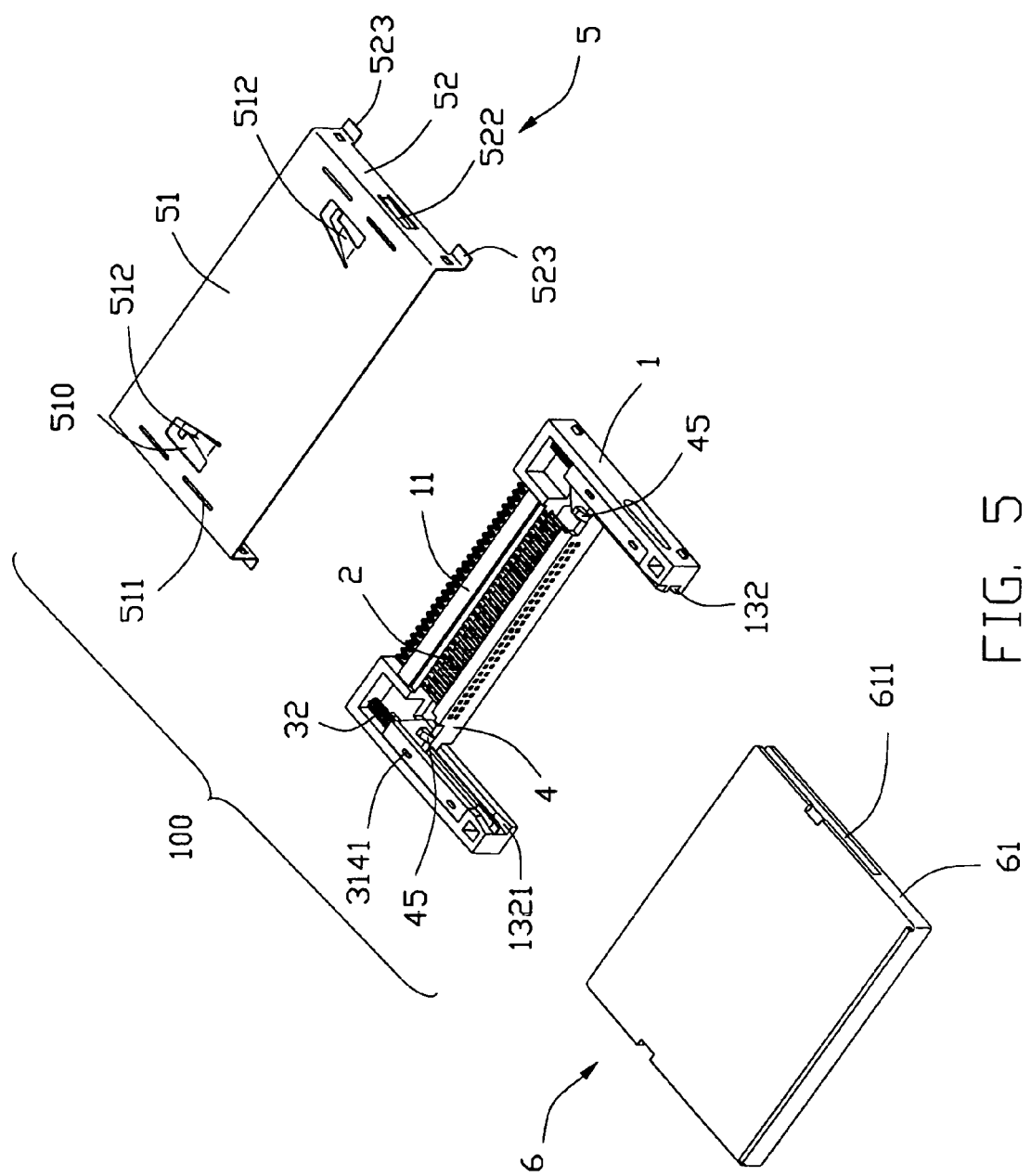
FIG. 5 is a partially assembled view of the electrical card connector.
Figure 6:
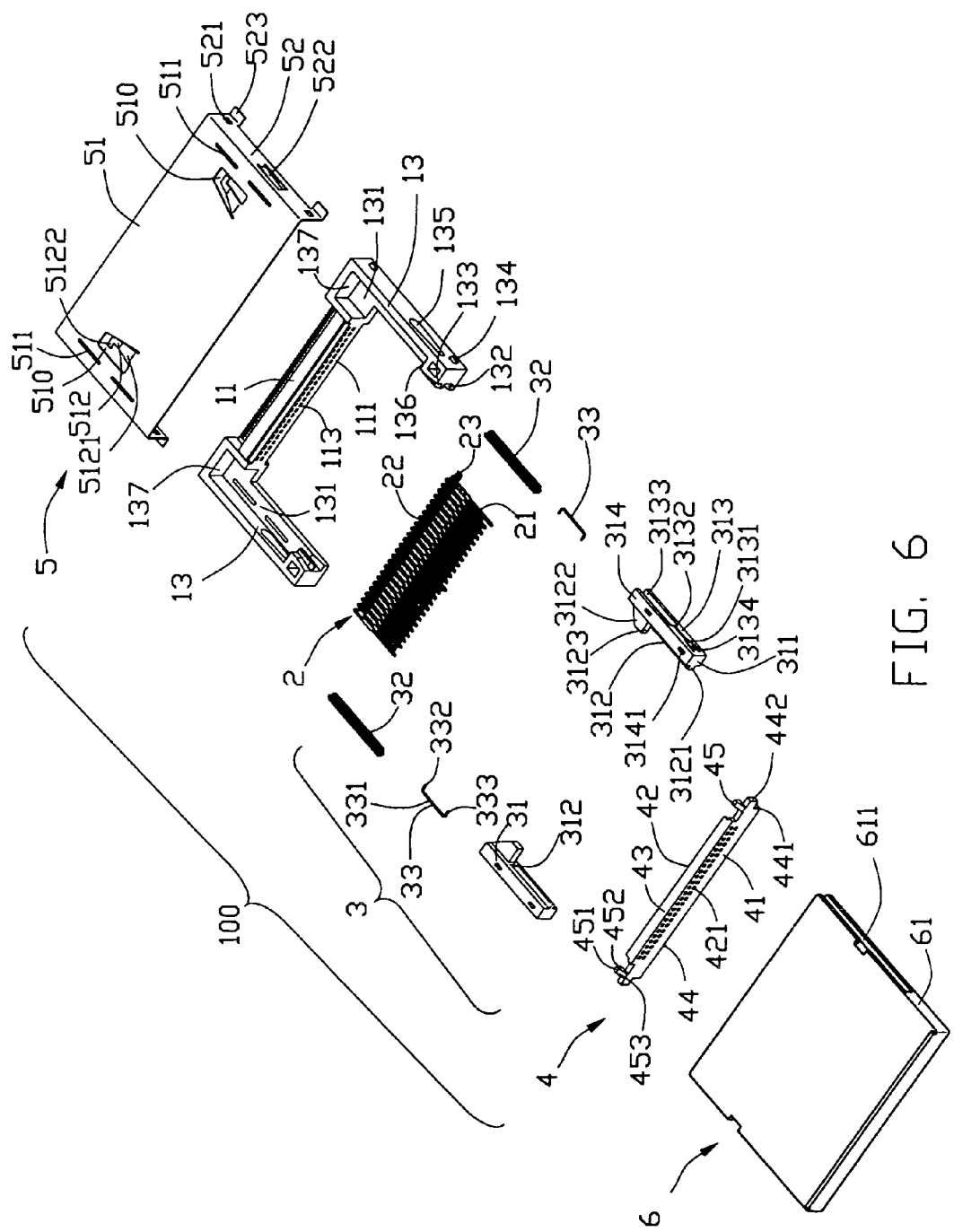
FIG. 6 is an exploded view of the electrical card connector.
Figure 7:
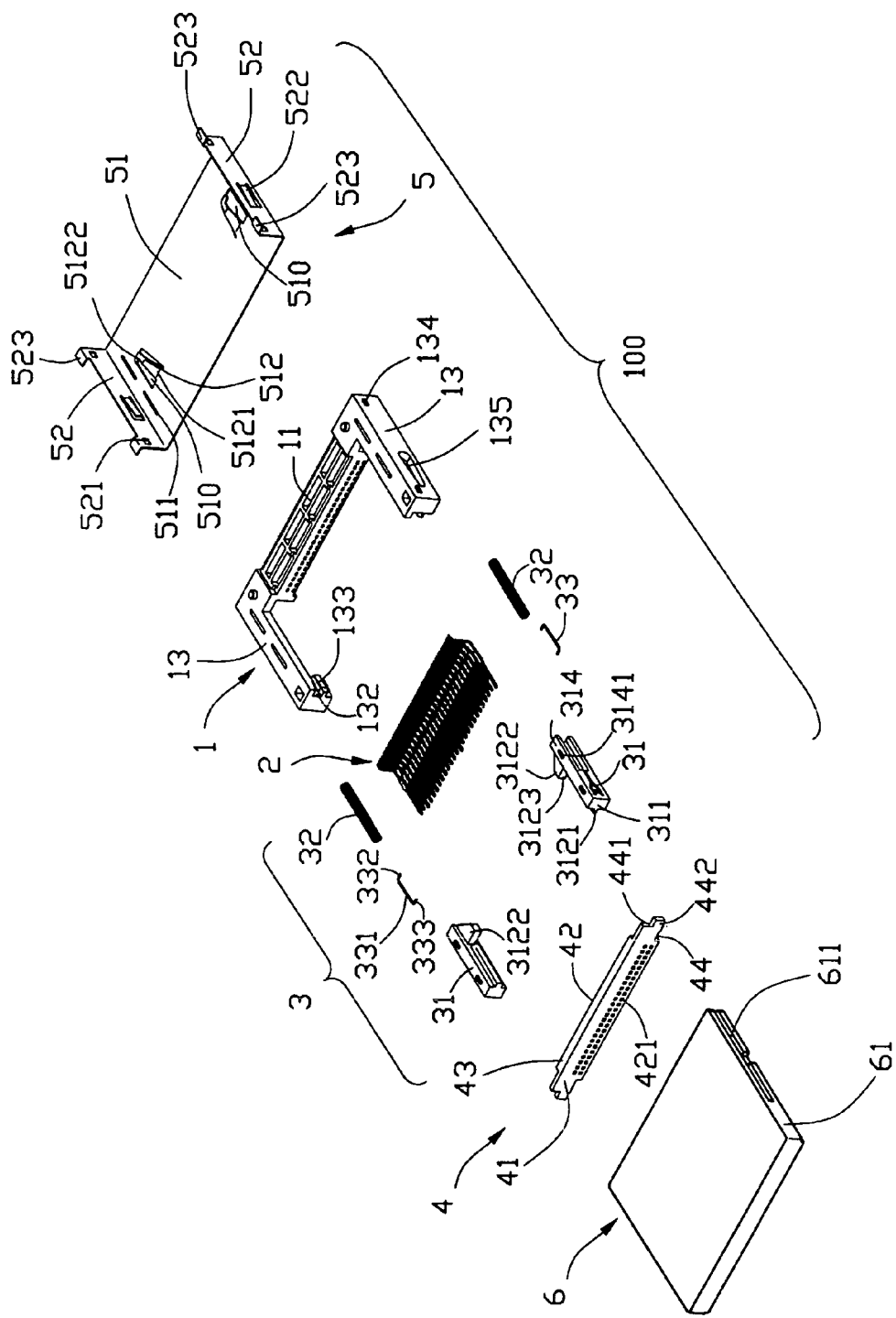
FIG. 7 is another exploded view of FIG. 6.

Referring to FIGS. 5-7, each eject mechanism 3 comprises a slider 31, a coiled spring 32 and a link rod 33. The slider 31 is slideably mounted in the chamber 131 of the arm 13 and capable of a back-to-forward movement. The slider 31 defines a front surface 311, an inner surface 312, an outer surface 313 opposite to the inner surface 312 and a top surface 314. The inner surface 312 contains a rib 3121 integrally formed in the front and an actuation portion 3122 formed in the back wherein the actuation portion 3122 further contains an engaging surface 3123 to fit with the spacer 4. The outer side 313 defines a longitudinal releasing slot 3132, a heart-shaped cam 3131 communicating with the releasing slot 3132 and a semi-circular notch 3133 for accommodating the coil spring 32 therein. The heart-shaped cam 3131 further contains a locking portion 3134. The top surface 314 further contains a pair of tubers 3141 for mating with the metal shield 5.

The coil spring 32 give the slider 31 elastic force to realize eject the card 6 from the electrical card connector 100 wherein a front end of the coiled spring 32 is received in the semi-circular notch 3133 and a rear end is engaging with rear stop wall 137.

The link rod 33 is substantially strip and forms a middle portion 331, a first hook 332 and a second hook 333 sidewardly bending from opposite ends of the middle portion 331 thereof. The first hook 332 is inserted into the mounting hole 1351 of the insulator 1 for retaining purpose, while the second hook 333 can move in the heart-shaped cam 3131 and the releasing slot 3132.

The spacer 4 defines a front face 41, a rear face 42 opposite to the front face 41, a top face 43 and a bottom face 44. A plurality of holes 421 are defined through the front face 41 and the rear face 42 corresponding to the contacts 2. The spacer 4 is located before the contacting portions 21 of the contacts 2 and the distal ends of contacting portions 21 are hidden in the holes 421 thereof before a insertion of the electrical card 6. A pair of latching portions 45 are extending upwardly from the lateral sides of the top face 43. Each latching portion 45 defines a contractive tip portion 451, a perpendicular back portion 452 and a chamfer 453 slanting upwardly to the tip potion 451. There further defines a pair of openings 441 on the later sides of the spacer 4 and forms a couple of tabs 442 which can move on the ribs 3121 and the lead flange 133 along the direction of card insertion and ejection.

The metal shield 5 includes a top plane 51 and a pair of side planes 52 respectively extending downwardly from the lateral side of the top plane 51. On the opposite sides of the top plane 51, there forms two pairs of longitudinal slits 511 and a couple of cutouts 510 disposed adjacent to the slits 511. The slits 511 are fitting with the tubers 3141 of the slider 31. Each cutout 510 forms an integrally finger 512 extending from the top plane 51 for engaging with the latching portions 45. The finger 512 further defines a cantilever 5121 extending into the receiving space 14 for abutting against the front and top edge (not labeled) of the electrical card 6 and a latch member 5122 extending and bending from the cantilever 5121 to lock with the back portion 452 of the latching portion 45. Each side plane 52 further defines a couple of apertures 521 for engaging with the flanges 134 of the insulator 1, a resistant piece 522 for fitting with the recess 135 and a plurality of soldering tails 523 bent from each side plane 52 to be soldered on the PCB.

Referring to FIGS. 4-7, the electrical card 6 in this embodiment of the present invention is a standard CF card wherein the card 6 defines an engaging face 60 and two lateral portions 61. A plurality of pinholes (not signed) in two rows are set in the engaging face 60 for mating with the contacts 2. Each lateral portion 61 contains a depression 611 thereof for mating with the lead flange 133 and the rib 3121.

Referring to FIGS. 4-8, in assembly, firstly, the contacts 2 are assembled with the insulator 1 wherein the contacting portions 21 extend through the passageways 113 into the receiving space 14 for electrically contacting with the card 6, the retaining portions 22 are secured in the apertures 1121 of the back wall 112, and the soldering portions 23 extend beyond the base portion 11 to be soldered on the PCB. Secondly, the front end of the coil spring 32 is positioned in the semi-circular notch 3133 of the slider 31 and then the slider 31 is accommodated in the chamber 131 of the guiding arm 13. Under the elasticity of the spring 32, the rear end of the spring 32 engages with the rear stop wall 137 of the chamber 131 and the front surface 311 of the slider 31 abuts against the front stop wall 136 of the chamber 131. Under this condition, the rib 3121 aligns and is level to the lead flange 133 of the guiding arm 13 so that the channel 132 is extending backwardly along the guiding arm 13. Successively, the first hook 332 of the link rod 33 is inserted into the mounting hole 1351 of the insulator 1 and the second hook 333 can move in the heart-shaped cam 3131 and the releasing slot 3132. Successively, the spacer 4 is mounted on the insulator 1, wherein the tabs 442 are disposed on the corresponding ribs 3121 of the slider 31 along the card-insert direction until the tabs 442 abut against the engaging surface 3123 of the slider 31. The contacting portions 21 of the contacts 2 are hidden in the holes 421 thereof for protection purpose before the card 6 is inserted in the receiving space 14. Finally, the metal shield 5 is fixed on the insulator 1 wherein the apertures 521 of the side planes 52 are mating with the embosses 134 of the guiding arms 13. The tubers 3141 of the slider 31 are moveable received in the slits 511 of the metal shield 5. Each latch member 5122 of the finger 512 is engaging with the back portion 452 of the latching portion 45 and the cantilever 5121 of the finger 51 is extending into the receiving space 14 for confronting the electrical card 6 (shown in FIG. 8). As a result, the combination of the electrical connector 100 of the present invention is finished.

Figure 8:
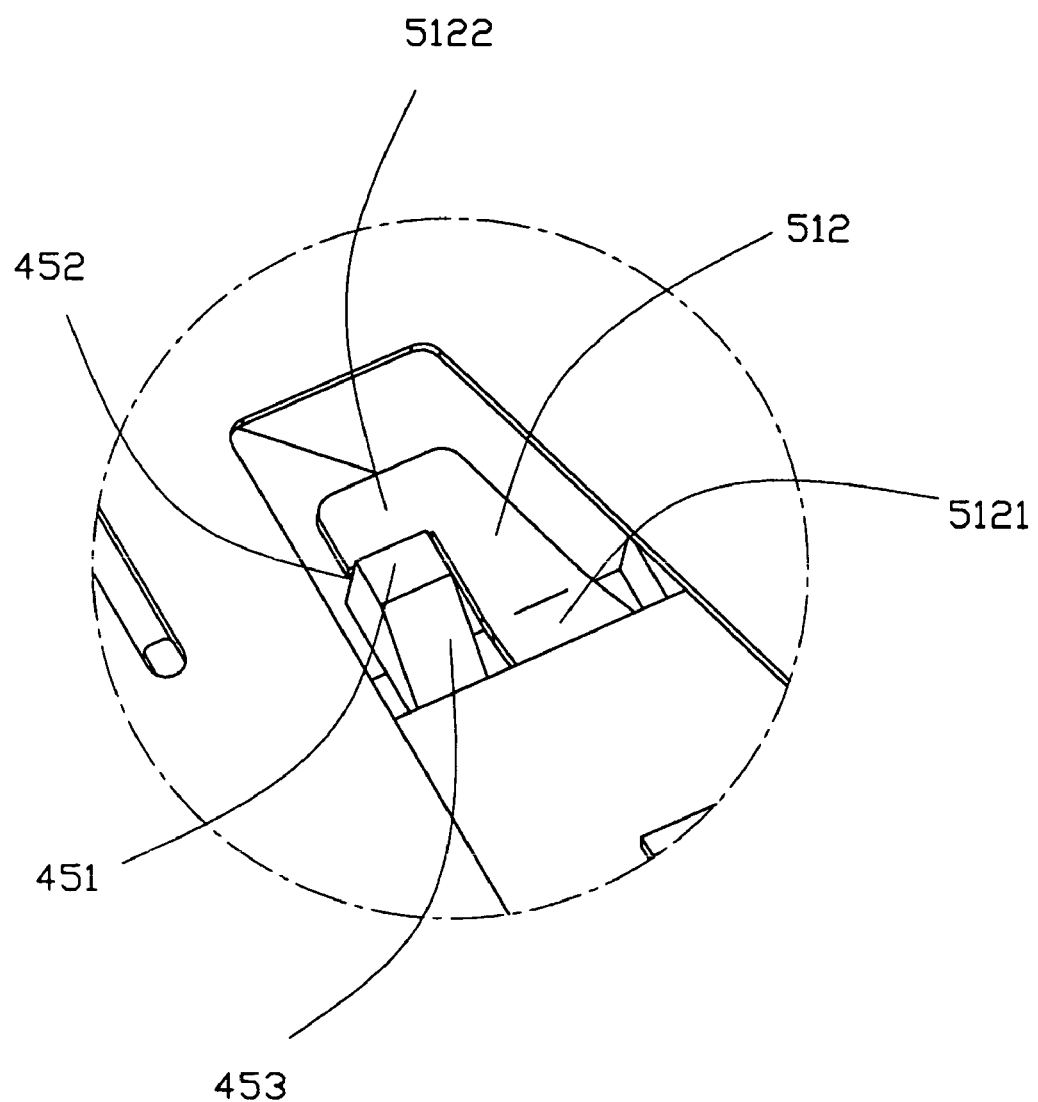
FIG. 8 is a partly enlarged view taken from the circle of FIG. 1.

Referring to FIGS. 1 and 8, in use, the electrical card 6 is inserted into the receiving space 14 of the electrical connector 100. The card 6 moves along the bottom wall 1321 of the channel 132 along the card-insert direction wherein the depressions 611 of the electrical card 6 are mating with the lead flanges 133 and ribs 3121 of the slider 31. The front and top edge (not labeled) of the card 6 abuts against the cantilever 5121 and lifts the latch member 5122 outwardly. The latch member 5122 disengages from the back portion 452 of the latching portion 45. The spacer 4 together with the slider 31 is pushed by the card 6 along the card-insert direction. The coiled spring 32 is compressed. The contacting portion 21 of each contact 2 expose from the front face 41 of the spacer 4 to be electrically connected with the card 6. The first hook 332 slides in the releasing slot 3132 and the heart-shaped cam 3131. When the card 6 is fully inserted in the card connector 100, the first hook 332 is locked in the locking portion 3134 of the heart-shaped cam 3131 and the card 6 is retained in the card connector 100 preventing the card 6 from falling out of the connector 100 due to unexpected external forces. When further exerting a forward force on the fully inserted card 6, the card 6, together with the slider 31 and the spacer 4, moves rearwards. The slider 31 and the spacer 4 return to the initiative position via the elastic force recovery of the coiled spring 32. At the same time, the first hook 332 moves from the locking portion 3134 to the releasing slot 3132, thereby the electrical card 6 is ejected the connector 100.

It is known to all, in the field of memory card, the CF card is the thickest one. When other cards are inserted in the card connector 100, the latch member 5122 can't be moved upwardly an enough distance on account of the thickness of such cards being thinner than that of the CF card so that the spacer 4 can't be moved and the card can't be further inserted.

Comparing to prior arts, the card connector 100 according to the present invention defines a latching portion 45. The metal shield 5 comprises a finger 512 having a cantilever 5121 extending into the receiving space 14 for engaging with the card 6 and a latch member 5122 located behind the latching portion 45 along the card-insert direction. By this arrangement, only the CF card can be inserted in the receiving space 14 to connect the contacts 2, thereby preventing insertions of other cards and destroying the contacts 2 thereof. Understandably, the latching portion 45 and the latch member 5122 commonly form a so-called anti-mismating device.

Figure 9:
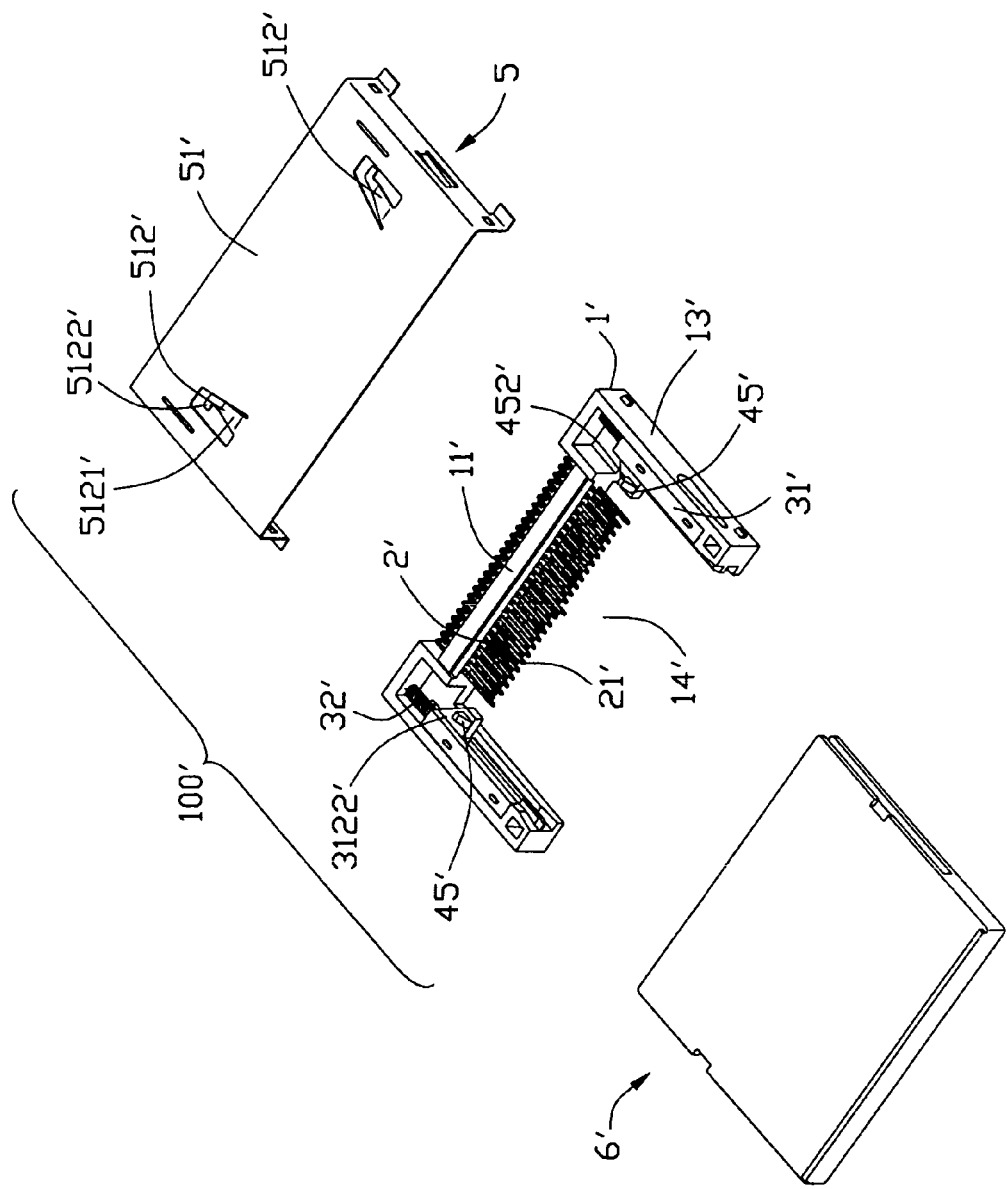
FIG. 9 is a partly exploded view of an electrical card connector according to the second embodiment.

Please refer to FIG. 9, a second embodiment is provided of the present invention. An electrical card connector 100' which is similar to the connector 100 of the first embodiment wherein the differences between them are that the electrical card connector 100I in the second embodiment has the latching portions 45' functions as the latching portion 45 of the spacer 4 in the first embodiment. Cooperation of the latching portion 45' and latch member 5122' acts as an anti-mismating device which can prevent full insertion of incorrect/thinner cards into the electrical card connector 100'.

Figure 10:
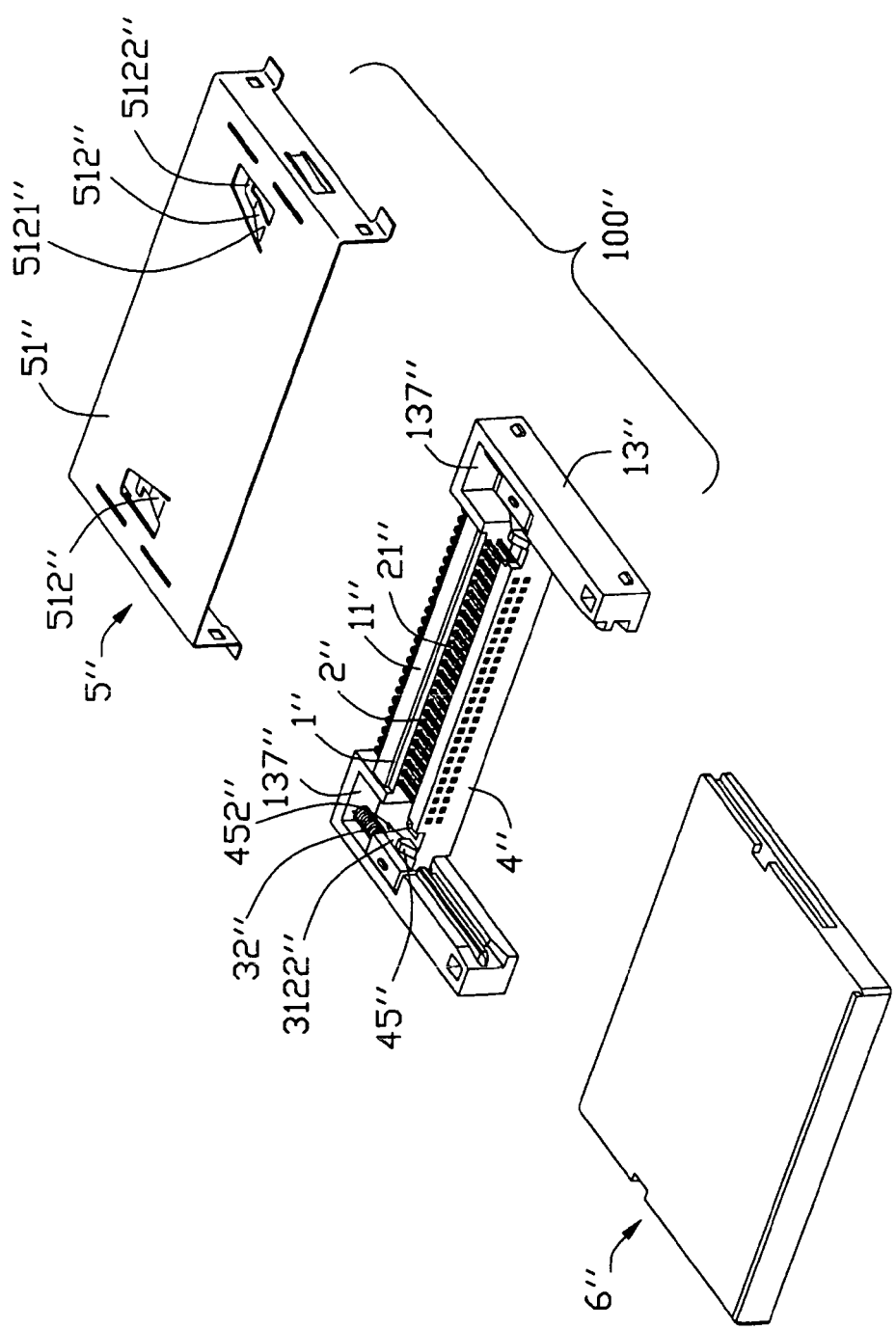
FIG. 10 is a partly exploded view of an electrical card connector according to the third embodiment.

Please refer to FIG. 10, a third embodiment is provided of the present invention. An electrical card connector 100" which is similar to the connector 100 of the first embodiment wherein the differences between them are that the electrical card connector 100" hasn't a slider and a link rod, and the coiled springs 32" are positioned between the spacer 4" and the rear stop wall 137". The metal shield 5" functions as the metal shield 5 of the first embodiment. When the electrical card 6" is inserted into the receiving space 14", the contacting portion 21" of each contact 2" is electrically connected the card 6". The contacting portions 21" are retained in the pinholes by friction force among them. Cooperation of the latching portion 45" and the latch member 5122" acts as an anti-mismating device which can prevent full insertion of incorrect/thinner cards into the receiving space 14" of the electrical card connector 100".

It is to be understood, however, that even though numerous, characteristics and advantages of the present invention have been set fourth in the foregoing description, together with details of the structure and function of the invention, the disclosed is illustrative only, and changes may be made in detail, especially in matters of number, shape, size, and arrangement of parts within the principles of the invention to the full extent indicated by the broad general meaning of the terms in which the appended claims are expressed.

What is claimed is:

1. An electrical card connector for receiving a card therein, comprising:
    an insulative housing and defining a card receiving space thereabouts;
    a plurality of contacts disposed in the housing with contacting sections extending into the card receiving space;
    a spacer covering the card receiving space in a front-to-back direction and movable along said front-to-back direction; and
    a metallic shield seated upon the housing and covering said card receiving space in a vertical direction perpendicular to said front-to-back direction; wherein
    the shield includes a moveable finger with a locking member thereon which is latchably engaged with the spacer when an incorrect/thinner card is inserted into the card receiving space so as not allow the spacer to move along said front-to-back direction thus preventing full insertion of said incorrect/thinner card into the card receiving space, while said moveable finger is urged by a correct/thicker card to be disengaged from the spacer so as to allow the spacer to move along said front-to-back direction, thus permitting full insertion of the correct/thicker card into the card receiving space.

2. The electrical card connector as claimed in claim 1, wherein the spacer defines a plurality of through holes through which the contacting sections extend for mating with the inserted card.

3. The electrical card connector as claimed in claim 1, wherein the locking member invades the card receiving space.

4. The electrical card connector as claimed in claim 1, further including a slider moveable along said front-to-back direction, wherein said slider is directly actuated by the spacer rather by the inserted card.

5. The electrical card connector as claimed in claim 4, wherein engagement between the slider and the spacer allows ejection of the card from the card receiving space.

\* \* \* \* \*